Figure 1:
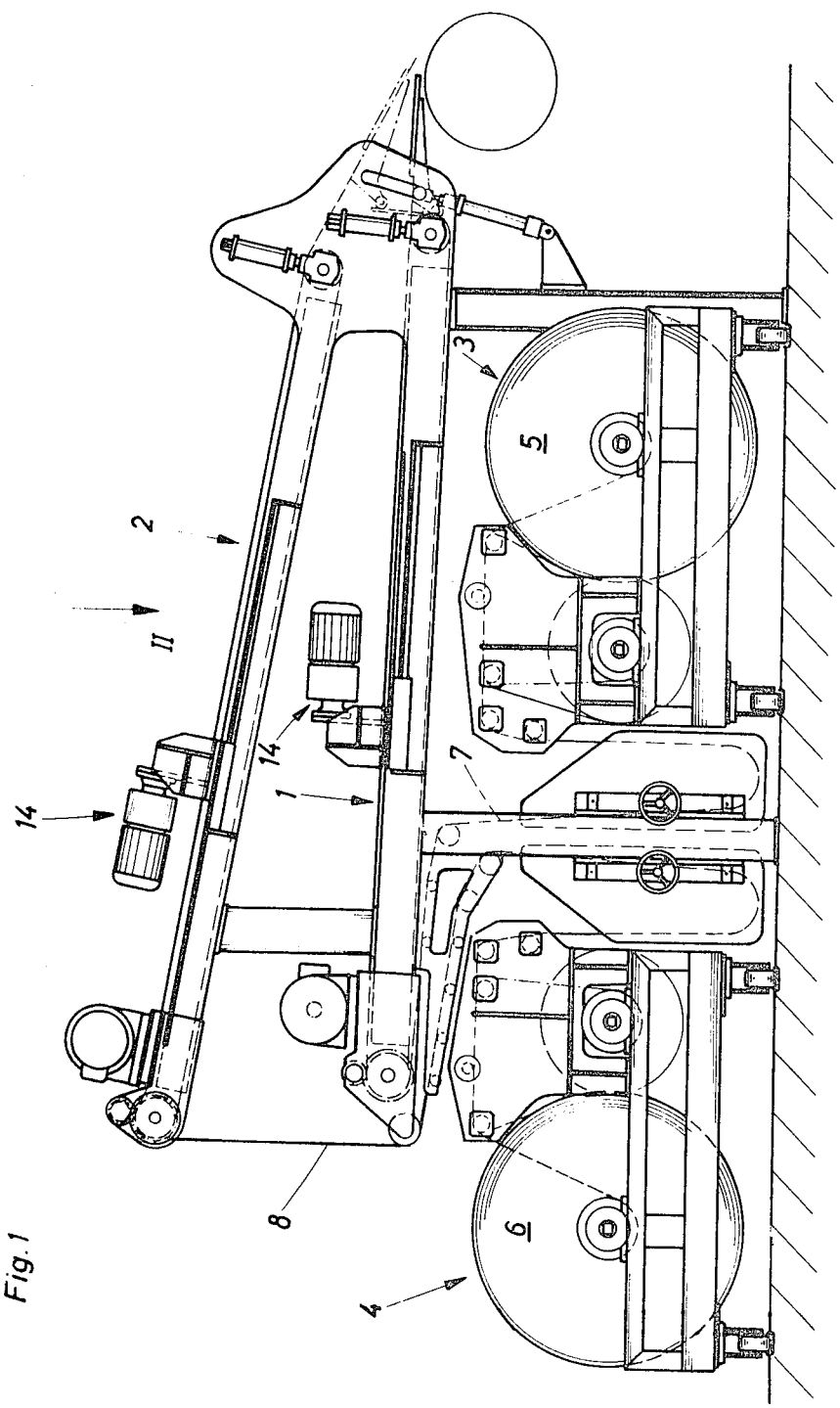

United States Patent

Balle

[15] 3,641,855
[45] Feb. 15, 1972

[54] DEVICE FOR CUTTING CORD WEBS OF PNEUMATIC TIRES

[72] Inventor: Walter Balle, Dornigheim/Kreis, Hanau

[73] Assignee: Leonhard Herbert Maschinenfabrik, Dornigheim/Kreis, Hanau, Germany

[22] Filed: May 12, 1970

[21] Appl. No.: 36,638

[30] Foreign Application Priority Data

May 13, 1969 Germany .................. P 19 24 355.1

[52] U.S. Cl. .................. 83/171, 83/374, 83/513, 83/554, 83/555, 83/559
[51] Int. Cl. .................. B26d 7/10, B26d 7/26
[58] Field of Search .................. 83/171, 374, 513, 554, 555, 83/559

[56] References Cited

UNITED STATES PATENTS 2,665,757  1/1954  Stevens et al. .................. 83/555 UX

*Primary Examiner*—James M. Meister
*Attorney*—Watson, Cole, Grindle & Watson

[57] ABSTRACT

A device for cutting through cord webs for the production of pneumatic tires having cutters in a blade holder with a driving mechanism for the displacement of the cutters and a mechanism for transpiercing the cord webs with the cutter points.

20 Claims, 8 Drawing Figures

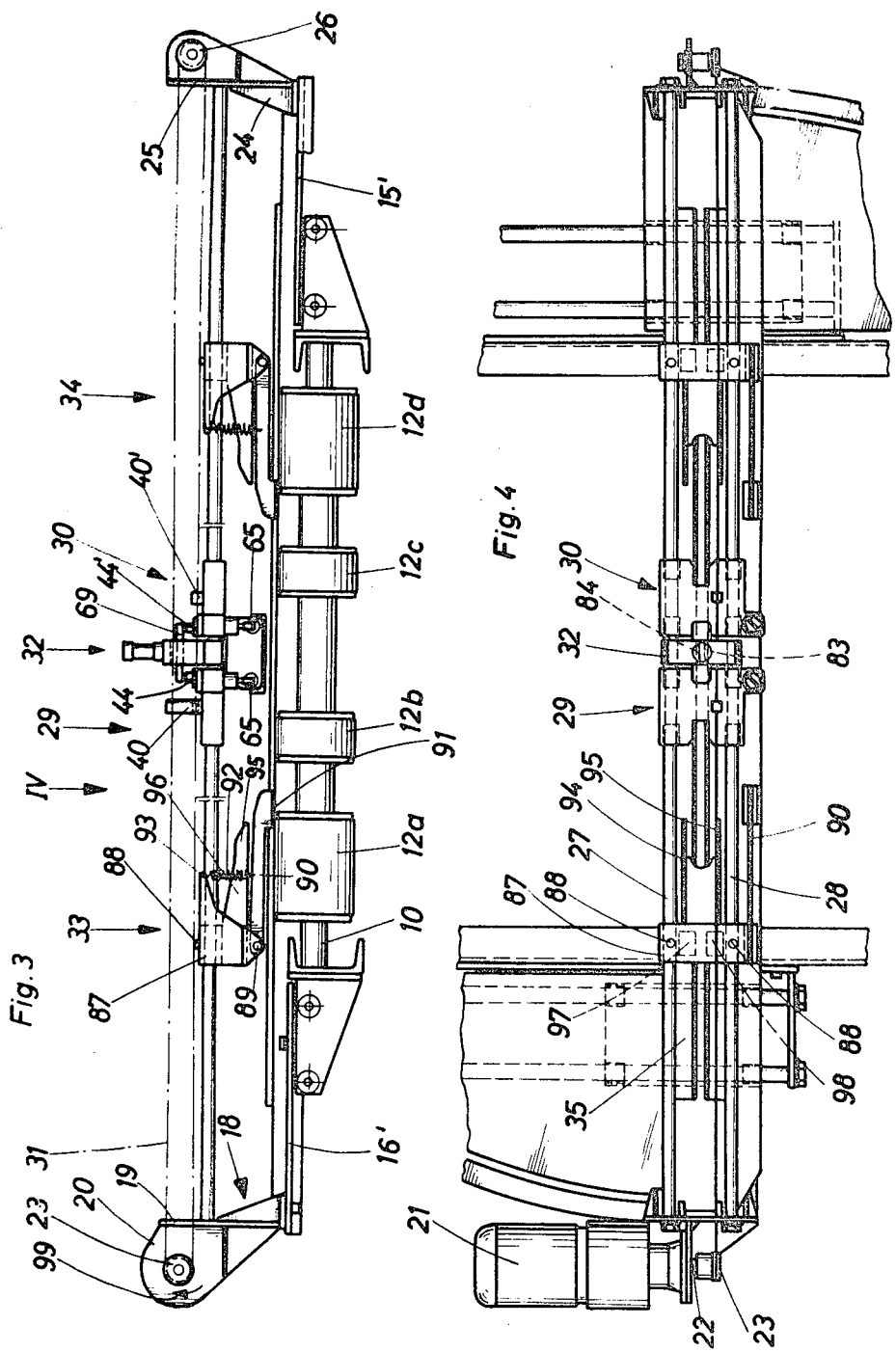

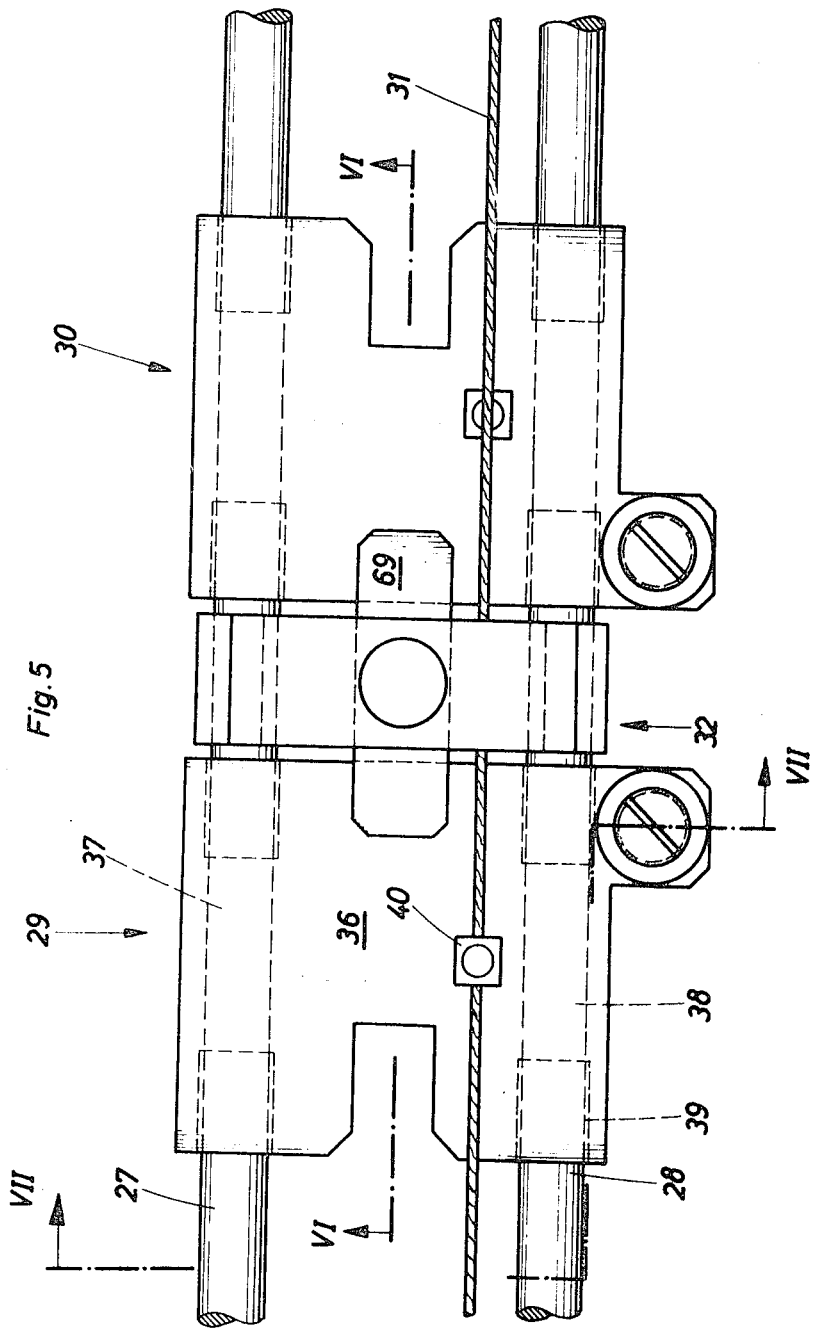

DEVICE FOR CUTTING CORD WEBS OF PNEUMATIC TIRES

The invention relates to a device for cutting through cord webs for the production of pneumatic tires, comprising two downwardly sharpened cutters, of which each is fastened on a blade holder guided in the cutting direction, a driving mechanism for the displacement of the cutters in opposite directions and a mechanism for transpiercing the cord web with the cutter points which, at the beginning of the cutting action, are approached to each other until mutual contact occurs, initial position.

Devices for the cutting to size of cord webs are employed in the production of pneumatic tires to cut a cord web having rubber-coated threads extending obliquely to their longitudinal direction, parallel to the direction of the threads. To this end, the pieces cut off the web are of such length that they may be wrapped with small overlap on a tire molding drum into a continuous ring. During this severing action, it is only the rubber layer connecting two adjacent threads of the cord web to each other which may be cut through. Cutting or even damage to threads must be avoided.

In a known device of the kind defined initially, French Pat. No. 1,220,265, the two blades are rigidly fastened on carriages or slides which are untwistably guided in a carriage guideway. A bearing element extending along the entire length of cut is swivellable about a central vertical axis. The adjustment of the blades to the not always rectilinear line of the threads is to be performed by small swiveling movements of the bearing element as a whole. To pierce the cord web, the latter is raised by means of a sleeve into which the blade points may penetrate. After the lowering of the sleeve, the cord web is to be held spaced apart from its support solely by means of notches in the blades.

Despite the swivellability of the bearing element, a precise adjusting of the blades to the line of the threads is not possible in the known device, since the case will never arise in practice in which the deflection of one blade in one direction will correspond to a precisely identical deflection of the other blade in the other direction. This condition would have to prevail, for both blades to follow the line of the threads. Damage or at least undesirable localized stripping of the crude rubber off the threads adjacent to the cutting edge will accordingly be avoidable. Since the cold crude rubber composition is relatively tough, the known device requires sharp blades, which again increases the risk of damaging or nicking the blades. Finally, a doubt must persist as to whether the notches in the blades are adequate to hold the cord web spaced apart reliably from their support.

The invention is based on the problem of improving a device of the kind defined initially, in such manner that the blades may independently follow the line of the threads. In further developments of the invention, it is intended to render it possible for the tough crude rubber composition to be cut through even with relatively blunt blades and to insure the required reliable freedom of movement of the blades in such manner that these have enough room for the movement below the cord web, in any event.

It is therefore an object of the invention, to resolve this problem by the fact that each blade is fastened swivellably around a vertical axis on its blade holder. With such an arrangement of the blades, the deflection of the one blade by the cord web does not affect the entire bearing unit along which the blades are displaceable, since the adjustment of the blade to the line of the threads is performed by a swiveling displacement relative to blade holders guided on the bearing unit. Each of the blades can separately follow the thread line it encounters, so that they do not affect each other. Even if the cord threads extend in irregular and asymmetrical wavy lines, there is no danger of damaging the threads. It is no longer necessary moreover for the bearing unit along which the blade holders are displaceable, to be suspended in swivellable manner. On the contrary, this bearing element may be set fixedly to the oblique position of the cord threads. The swivellable mounting of the blades can cope without any difficulty with the deviations encountered, and this is advantageous in the structural sense, since a central axis is no longer needed for the bearing element, as in the known coase, and this element may be secured by its extermities. A bridge over the entire cord ply feed mechanism, from which the bearing unit is suspended, is thus unnecessary. On the contrary, this bridge is formed by the bearing unit itself.

The swiveling range of the blades is preferably limited which may be accomplished in simple manner by means of stops. Excessive turning of the blades after completely severing the cord web, is prevented thereby. According to a further feature of the invention, the blades upon coming close to the initial position, may be aligned on each other by the mutual engagement of truing elements, in a plane parallel to the cutting direction. To this end, each blade may be secured on an aligning element swivellable relative to its blade holder, a wedgelike incision being wrought, or provided in one aligning element, and a wedgelike projection fitting into the wedgelike incision being wrought or provided on the other aligning element.

This is accomplished in this way that the blades are always aligned precisely before transpiercing the cord web, thus assuring that the two blades cut into the same interstice between two threads.

According to an advantageous further feature of the invention, a heating device is incorporated for heating the blades. The heating device may, for example have heating plates in contact with the flat sides of the blades and these plates preferably being heatable by means of electric heating inserts. A particularly intimate contact between the heating plates and the lateral blade surfaces is established by pressing the heating plates against the blade surfaces by spring pressure. The heating device preferably consists of two separate heating devices which are situated outside the area of the cord web at the points at which the blades are situated in their separated position, final position.

The cut may be made much more easily due to heating the blades, since the nonvulcanized rubber composition in which the threads of the cord web are imbedded, is softened considerably upon being heated. An advantageous temperature for the blades amounts to approximately 150° to 200° C. The substantial simplification of the severing action assured by heated blades renders it possible to make use of blunt blades which have a cutting angle of approximately 60°. The application of such blunt blades enhances safety against damaging the threads.

According to a further development of the invention, a cutting bar on which the cord web rests is situated in the area of the cutting line, the cutting bar having a groove extending throughout the length of the cut and receiving the blade points a runup area reaching as far as the top edge of the groove is advantageously provided at least on the side of the groove on to which the cord web runs. When employing a cutting bar of this kind, the cord web need not be held at a distance from its support by the blades, but rests constantly on the cutting bar even during the cutting action, thus completely preventing the blades from losing touch with the cord web and the cord web slipping off the blades.

According to another development of the invention, retaining elements clamping the cord web on its support are situated in the area of the lateral edges of the cord web. The retaining elements are advantageously controllable by means of the blade holders, and the arrangement may be such that a lifting spring acts on the retaining elements provided as one-armed levers and that these levers have an upper runup curvature on which runup the thrust units which are resiliently sprung, are fastened on the blade holders and preferably provided as rollers. The application of such retaining elements has the advantage that even when the blades do not reach the lateral edges of the cord web simultaneously, the latter is not entrained sideways by the drag of the still cutting blade.

The blades are advantageously fastened on vertical displaceable swivel bolts and the bearing elements for the blades have thrust units arranged on them which are preferably formed as rollers, which in the terminal positions run up on sliding or rolling surfaces of such nature that the swivel bolts are lifted together with the blades. The raising of the blades after termination of the cut, is thus accomplished in simple manner.

To lower the blades for the purpose of transpiercing the cord web, a stationary bridge may have a preferably double-acting pressure fluid cylinder arranged thereon, whereof the piston rod carries a thrust plate cooperating with the upper extremities of the swivel bolts. Each swivel bolt then preferably has detent points for the cutting position and for the lifted position. These detent points may consist of grooves provided in the swivel bolts and of detent blades springily engaged in these grooves. The application of such detent or catch points has the advantage that a displacing mechanism for the lowering and lifting of the blades need be arranged only at the initial position and at the terminal position, and that the displacement produced at these points is maintained by means of the catch points in each case.

The blades may be notched a short distance behind the point and may widen upwards starting from this notch. The cutting point extends to either side of the notch in this case. The notch renders it possible to perform an unexceptionable "draw" cut, and while the blade is being drawn through, the material to be cut catches in the notch, and the cutting edges above and below the notch are both operative.

Figure 2:
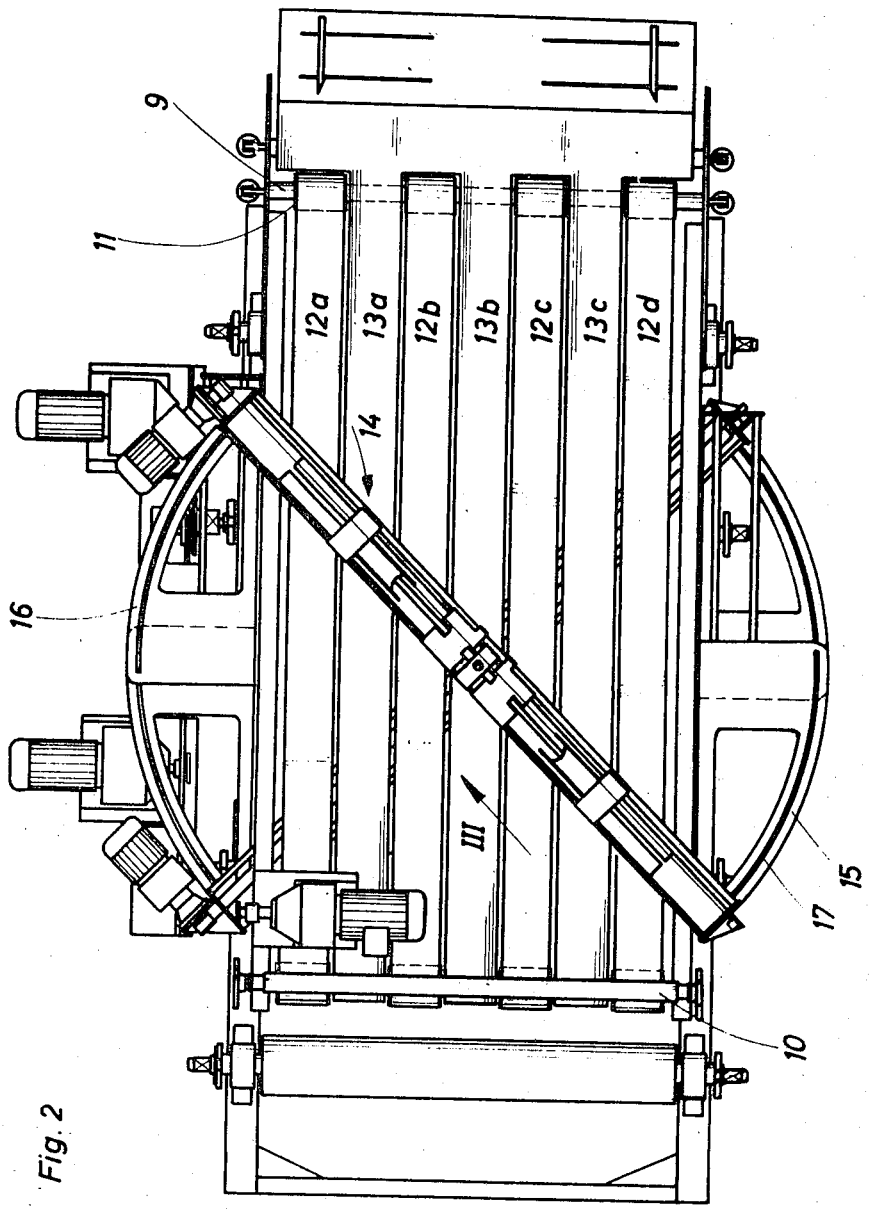
Figure 6:
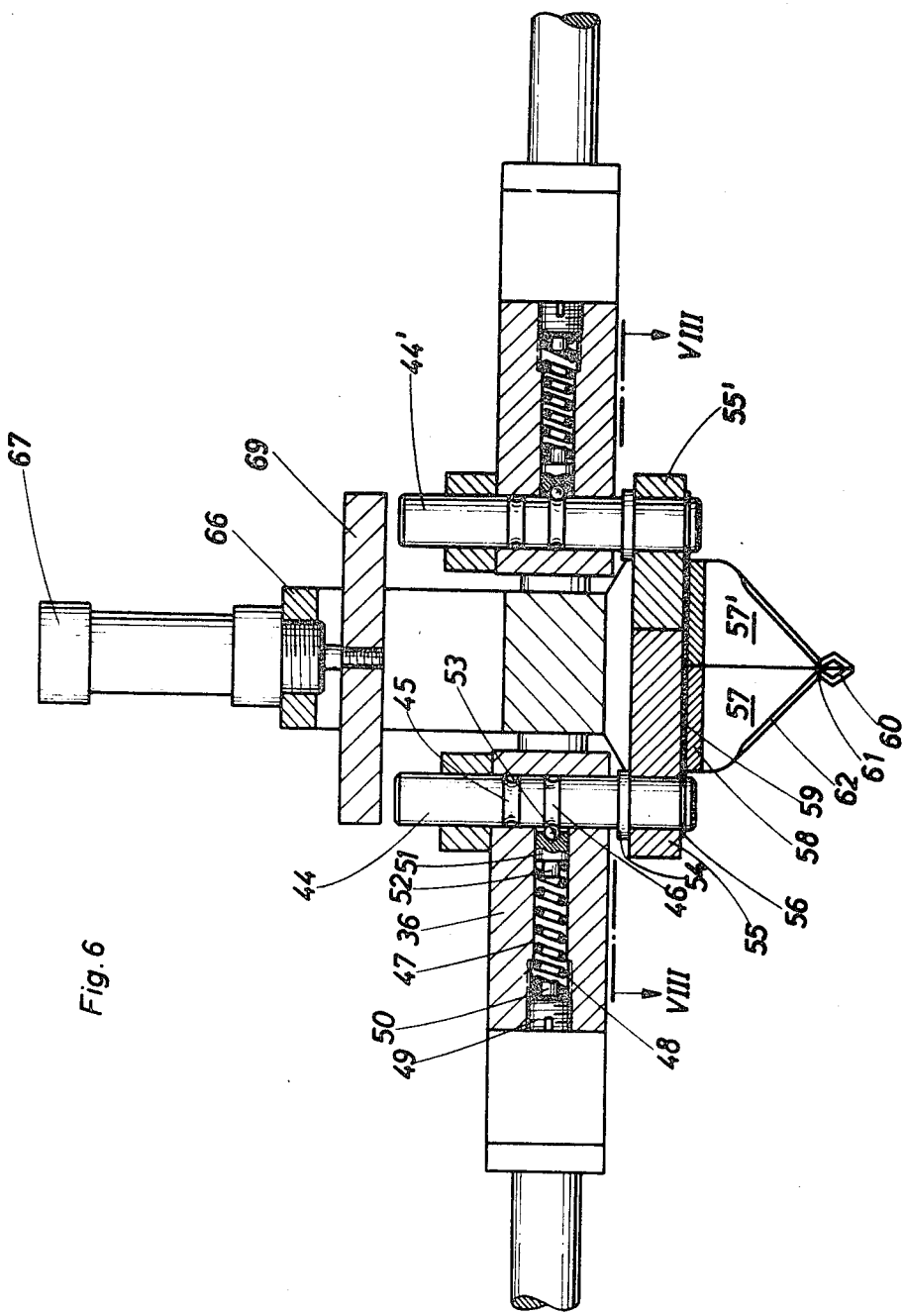
Figure 7:
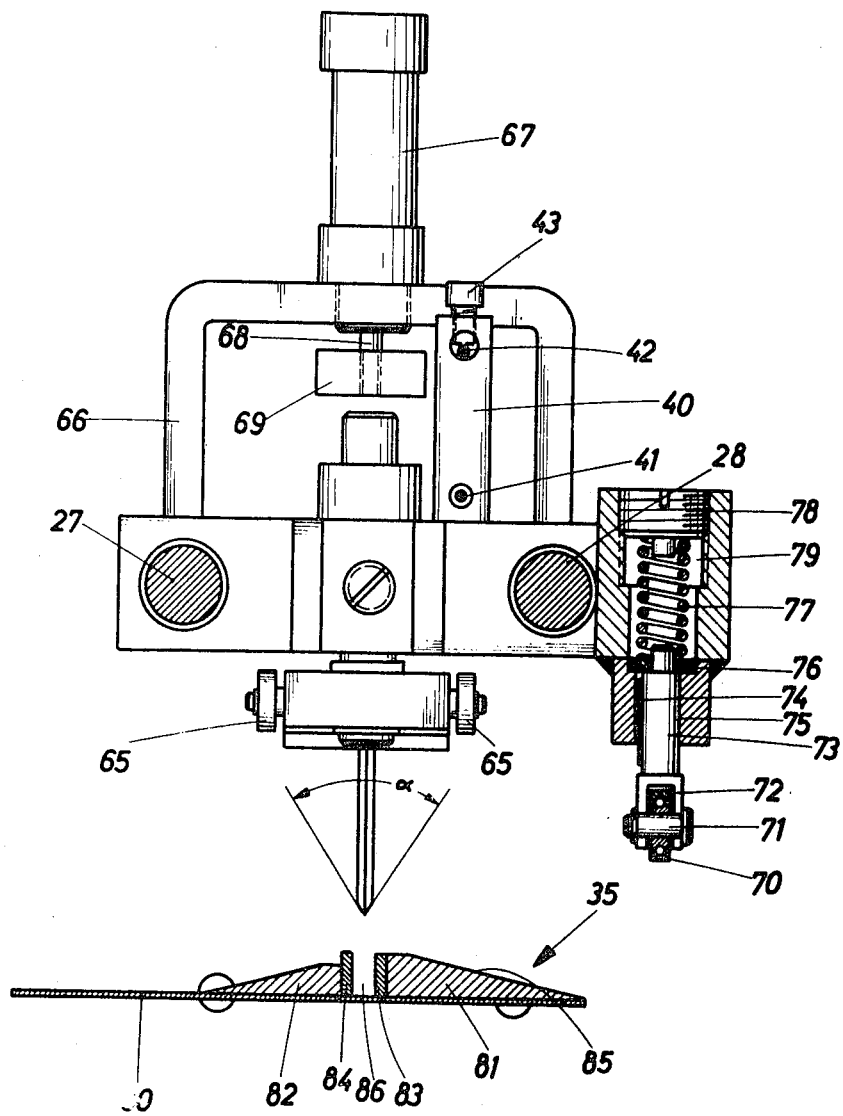
Figure 8:
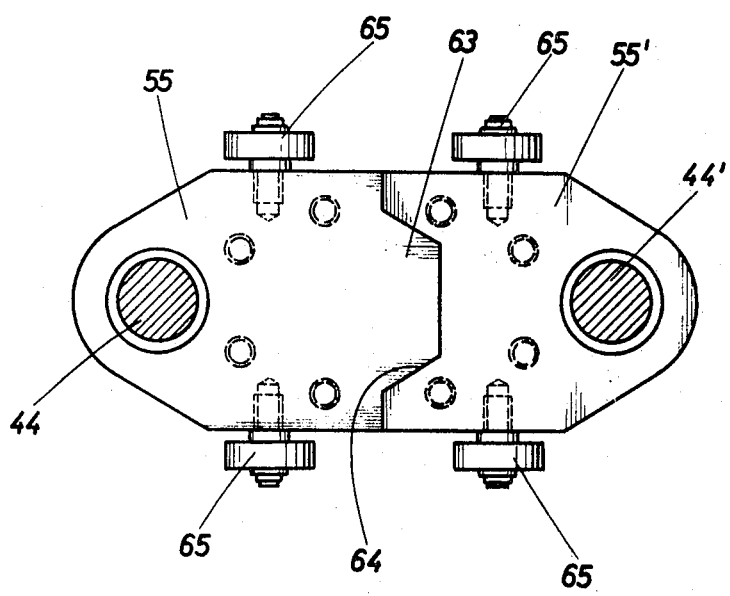

Further objects will be apparent from the following description when considered in connection with the accompanying drawings in which;

FIG. 1 is a side view of a feed mechanism for feeding cord webs to the tire molding machine, comprising two cutting devices according to the invention, FIG. 2 is a plan view of the device according to FIG. 1 taken in the direction of the arrow II in FIG. 1, FIG. 3 is a side view of the cutting device situated at the bottom in FIGS. 1 and 2, taken in the direction of the arrow III in FIG. 2, FIG. 4 is a plan view of the cutting device taken in the direction of the arrow IV in FIG. 3, FIG. 5 is a plan view of the middle portion of the cutting device, enlarged compared to FIG. 4, FIG. 6 is a section taken along line VI—VI in FIG. 5 in the direction of the arrows, FIG. 7 is a section taken along line VII—VII in FIG. 5 in the direction of the arrows, and FIG. 8 is a section taken along line VIII—VIII in FIG. 6 in the direction of the arrows.

The cord web feed assembly according to FIGS. 1 and 2 has two tables 1 and 2 and unreeling devices 3 and 4 housed under the table 1, with storage rolls 5 and 6. The continuous cord web is conveyed onto the tables 1 and 2 by deflecting devices. The cord web unreeled from the storage roll 5 is marked 7 and the cord web unreeled from the storage roll 6 is marked 8. The tables 1 and 2 in each case consist of a frame in which are installed shafts 9 and 10, see FIG. 2, and on these shafts there are arranged drums 11 over which are laid table belts 12a to 12d. Between these table or platform belts are situated supports 13a, 13b and 13c. It is apparent that by displacement of the table belts 12a to 12d, a cord web lying on these may be pulled from left to right as seen in FIGS. 1 and 2.

The cutting devices 14 are indicated as a whole, by means of which it is possible to cut pieces off the cord webs 7 or 8 to form the object of the present invention. These cutting devices will be described in particular in the following.

Each cutting device is adjustable in its angular position relative to the tables 1 and 2, for which purpose setting arcs 15 and 16 in are provided slots 17, are arranged on the side beams of the table frames. The cutting devices 14 may be immobilized at optional angular positions relative to the tables 1 and 2. One of the cutting devices is illustrated to enlarged scale in FIGS. 3 and 4. In this case, the setting area are marked 15' and 16', since they consist of setting arcs coordinated with the lower table 1. A bearing block 18 displaceable along the setting arc slot is fastened on the setting arc 16' situated at the left in FIG. 3. This bearing block 18 has a vertical bearing plate 19 with a bearing flange 20 on which is fastened a geared motor 21. A cable pulley 23 is situated on the output shaft 22 of the geared motor. A bearing block 24 is fastened in the same manner on the setting arc 15' situated at the right end in FIG. 2. On the bearing plate 25 of this bearing block, a cable deflection roller 26 is rotatably arranged. Guiding rods 27 and 28 extend between the two bearing plates 19 and 25.

Carriages marked 29 and 30 as a whole are slidable along the guiding rods 27 and 28 and these carriages are displaceable by means of the endless carrying cable 31 slung around the cable pulleys 23 and 26. Between the carriages 29 and 30 is situated a bridge 32, which is firmly connected to the guiding rods 27 and 28 and not slidable relative thereto. Retention devices 33 and 34 are fastened on the guiding rods 27 and 28 and these retention devices are immobilized relative to the rods, but for adjustment purposes are longitudinally displaceable along the rods and immobilizable in any position. A cutting bar 35 is provided directly above the table belts 12a and 12d and below the rods 27 and 28.

The structure of the carriages 29 and 30, of the bridge 32 and of the cutting bar 35, is described in particular in the following with reference to FIG. 5.

The carriages 29 and 30 are provided in mirror-symmetry relative to each other, so that it is sufficient to describe one carriage, for example the carriage 29 and the latter has a base unit 36 in which are provided two parallel bores 37 and 38.

At the extremities of the bores are arranged guiding bushes 39 having a sliding fit for the rods 27 and 28, so that the base unit may easily be displaced along the rods. On the unit 36 is fastened a postlike part 40 which has two parallel bores 41 and 42, see FIG. 7. The traction cable 31 traverses the lower bore 41 with considerable clearance, whereas the upper run of the traction cable is clamped fast in the bore 42 by means of a clamping screw 43. Conversely, in the case of the other carriage 30, the lower run of the cable 31 is clamped fast and the upper run passes freely above the short post 40', FIG. 3. It is clear that the cable displaces the two carriages 29 and 30 in opposite directions during its displacement.

It is apparent from FIG. 6 that a vertical bolt 44 which can be turned relative to the unit 36, is arranged in the unit 36. Two annular grooves 45 and 46 of arcuate cross section are provided in the bolt 44. The base unit 36 moreover has provided therein a tapped bore 47 which extends at right angles to the seat bore of the bolt 44 and houses a coil spring 48. This coil spring bears against a plugging screw 49 with a centering shank. The opposite extremity of the spring 47 exerts thrust on a thrust element 51 with a centering shank 52, which thrust element acts as a seat for a detent or catch ball 53.

Close to its lower extremity, the bolt 44 is provided with a flange 54 and against this flange a blade-carrying plate 55 bears which is threaded on to the bolt 44 and is held in its position by means of a circlip 56 which engages in a groove in the bolt 44.

The blade 57 which is equipped at the top with a horizontal plate 58 arranged to be bolted on, is screwed to the carrying plate 55. Between the blade-carrying plate 55 and the bolting plate 58 is inserted a thermally insulating intermediate layer 59. The blade 57 has a cutting edge with a point 60, a notch 61 and a part 62 extending outwards obliquely from the deepest point of the notch 61. In FIG. 7, the angle of the cutting edge of the blade is shown. This angle alpha is relatively obtuse and may amount to 60° for example.

The symmetrically made carriage 53 corresponds entirely to the carriage 29 in structure. The blade 57' is equally precisely made in mirror-symmetry to the blade 57, whereas the blade-carrying element 55' carrying the blade 57' differs from the blade-carrying element 55.

The shape in plan view of the two blade-carrying elements 55 and 55' is apparent from FIG. 8. FIG. 8 shows that the carrying element 55 has a wedge-shaped projection 63 provided thereon, and that a wedge-shaped depression 64 is depressed in the carrying unit 55′. The projection 63 and the depression 64 fit one in the other in formlocked manner. It is clever that when the blade-carrying elements 55 and 55′ approach each other, they are aligned on each other by mutual engagement, even if they had initially been twisted about the axes of their swivel bolts 44 and 44′. Rollers 65, whose blade lifting function still remains to be described, are arranged on the blade-carrying elements 55 and 55′.

A spring urged roller 70 is arranged on the carriage 29 and this roller is formed by the outer ring of a small ball bearing, whose inner ring is secured on a bolt 71, which passes through the fork 72 of a spring-loaded pin 73. As a guard against twisting, a guiding wedge 74 is arranged on the spring-loaded pin, which engages in a coordinated groove in the seating bore 75 for the spring-loaded pin 73. On the upper extremity of the spring-loaded pin 73, there is provided a washer 76 on which thrust is exerted by a coil compression spring 77 whereof the upper extremity bears against a plugging or closing screw 78 for the bore 79 which receives the spring.

The washer 76 rests on a shoulder between the bores 79 and 75 when the roller 70 does not exert a thrust. With thrust against the roller, the washer 76 is lifted off this shoulder under compression of the spring 77.

The structure of the bridge 32 is apparent from FIG. 7 in particular. The bridge has a U-shaped stirrup 66 which is fastened on the guiding rods 27 and 28. On the web of the stirrup 66, there is fastened a double-acting pneumatic cylinder 67 whereof the piston rod 68 has a thrust plate 69 arranged thereon. The thrust plate 69 extends, FIGS. 5 and 6, parallel to the rods 27 and 28 so that it reaches over the upper extremities of the swivel bolts 44 and 44′.

The cutting bar 35, FIG. 4, is illustrated in cross section in FIG. 7. It consists of a relatively thin metal sheet 80, e.g., having a thickness of 1 mm., a runup element 81, a runoff element 82 and, in its middle area in which the bar is interrupted, two insert pieces 83 and 84 which extend along a short length only, however in this respect, see FIG. 4. The runup element 36 has a sloping plane 85 on which the cord web can conveniently slide over the groove 86 situated between the insert pieces 83 and 84. To prevent the cord web from getting caught on the runoff element 82, this latter is provided less high than the runup element 81. The relatively short insert pieces 83 and 84 have the same height however, to insure unexceptionable penetration of the blades. The insert pieces, which are short, do not impede the sliding-off of the cord web.

The retaining devices 33 and 34 are equally made in mirror-symmetry. They are described with reference to the retaining devices situated at the left in FIGS. 3 and 4. The retaining device has a base unit 87 which is displaceable along the rods 27 and 28 and is immobilizable in any position by means of clamping screws 88.

At 89 there is provided articulated thereto a lever 90 of which the front extremity carries a clamping area faced with a lining 91. A tension spring 92 which is secured to the unit 87 at 93, acts approximately on the middle of the lever 90.

Two fingers 94 and 95 of which the upper side has a runup curvature for the rollers 65 fastened on the blade-carrying plates 55 and 55′, see FIGS. 7 and 8, are fastened on the unit 87.

A heating device for the blade is also secured on the carrying unit 87 and this heating device consists of two separate heating elements 97 and 98 whose structure is not illustrated in detail. The heating elements may comprise electric heating inserts or "cartridges" which are inserted into heating elements which may be thrust under spring-loading against the sides of the blades.

The cutting device according to the invention operates as follows:

It is assumed that a severing operation has just been completed and that the two blades are in their spread apart position. In this position, the blades are heated from both sides to a temperature of approximately 200° C. by means of the heating devices 97 and 98. By driving the table belts 12a to 12d, FIG. 2, a cord web is then pulled onto the table and advanced so far that it extends towards the right beyond the cutting device in that required length. The control operation may for example, be energized by means of a light barrier which turns off the drive of the table belts when the required length of feed has been reached. During this feed, the cord web slides over the sloping runup plane 85, FIG. 7, over the cutting bar 35. After its advance, the cord web thus covers the groove 36.

The geared motor 21 is then started either by actuation of a switch or else automatically, so that the cable pulley 23 is operated in such direction that the carriages 29 and 30 are displaced towards each other. This is the case when the cable pulley 23 turns in the direction of the arrow 99, FIG. 3. The entrainment of the cable 31 is continued until the carriages 29 and 30 have reached the position shown in FIGS. 3 and 4. When the carriages 29 and 30 approach each other, the blade-carrying plates 55 and 55′ come into engagement with each other as has already been described with reference to FIG. 8. The blades are precisely aligned in one plane thereby. Upon actually reaching the initial or starting position, the pivot pins 44 and 44′ are located under the thrust plate 69. For initiation of the cutting operation, this piston in the pressure fluid cylinder 67 is then acted upon by pressure from above, so that the thrust plate 69 comes to bear on the swivel bolts 44 and 44′ and presses these downwards. The catch balls 53 are concomitantly forced out of the grooves 46 and, together with the bolts, the blade-carrying plates 55 and 55′ with the blades 57 and 57′ fastened thereon, are displaced downwards. The stroke of the piston in the pressure fluid cylinder 67 is so dimensioned that the bolts 44 and 44′ are pressed downwards only until the balls 53 click into the upper grooves 45. During the downward displacement of the blades 57 and 57′, the blade points 60 transpierce the cord web between two threads and then engage with their points in the groove 86, FIG. 7. The geared motor 21 is then placed in operation in a direction of rotation such that the cable pulley 23 turns in the opposite direction to that of the arrow 99 in FIG. 3. This causes the carriages to move apart, and the cord web is concomitantly cut through towards the sides, starting from the middle. This cut can be performed easily, thanks to the increased temperature of the blade, since the crude rubber composition is softened considerably by the heat. Damage to the cord threads is prevented reliably, due to the relatively obtuse angle of the cutting edge. By swiveling around the axes of the bolts 44 and 44′, the blades can adapt themselves precisely to the run of the threads, that is to say, independently of each other.

When the carriages 29 and 30 come close to the marginal area of the cord web, the thrust rollers 70 run onto the upper sides of the levers 90, FIGS. 3 and 4, these levers thereby being forced downwards while overcoming the force of the tension springs 92. The contact force is determined by the force of the spring 77 compared to that of the return spring 92. The spring 77 is compressed when the roller 70 runs up. The clamping surfaces 91 of the retaining elements are thereby firmly pressed on the cord web, and retain the latter. This accomplishes that the cord web cannot be pulled away laterally even if one blade has already reached the dege of the cord web and the other blade still has to cut a short distance.

After completion of the cut, the rollers 65 run onto the fingers 95. Owing to the rising runup curvature 96, the blade-carrying plates 55 and 55′, and thus also the blades 57 and 57′, are raised until the catch balls 53 which had been forced out of the upper groove 65, engage again in the lower groove 46. In this idle position, the blades are situated between the heating devices 97 and 98 and are heated there.

A further length of cord web is then pulled on and the actions described are performed again.

I claim:

1. Device for cutting through cord webs for the production of pneumatic tires comprising a blade carrier, two downwardly pointed blades of which each is fastened on the blade carrier guided in the cutting direction, a driving mechanism for the displacement of the blades in opposite directions, and a device for transpiercing the cord web by points of the blades which are brought closer to each other at the start of the cutting operation until they are in mutual contact as the initial position, each blade being swivellably arranged around a vertical spindle and fastened on its blade carrier.

2. Device according to claim 1, in which the swiveling range of the blades is limited.

3. Device according to claim 1, in which aligning elements are provided and the blades are aligned in a plane parallel to the direction of cutting by mutual engagement of the aligning elements upon coming close to the starting position.

4. Device according to claim 1, in which aligning elements are provided and the blades are aligned in a plane parallel to the direction of cutting by mutual engagement of the aligning elements upon coming close to the starting position and each blade being fastened on an aligning element which is swivellable relative to its blade carrier, and in which a wedge-shaped depression is provided in one aligning element and a wedge-shaped projection fitting into the wedge-shaped depression being provided on the other aligning element.

5. Device according to claim 1, in which an electric heating device is provided for heating the blades.

6. Device according to claim 1, in which an electric heating device is provided for heating the blades, the heating device comprising heating plates which are heatable by means of electric heating cartridges and bear against the flat sides of the blades.

7. Device according to claim 6, in which the heating plates bear against the blade surfaces under spring pressure.

8. Device according to claim 1, in which an electric heating device is provided for heating the blades, the heating device consisting of two separate heating devices which are situated outside the area of the cord web, at the points at which the blades are situated in their spread apart position.

9. Device according to claim 1, in which the area of a cutting line has a cutting bar having a groove therein extending along the entire cut in which the blade points are engaged.

10. Device according to claim 1, in which the area of a cutting line has a cutting bar having a groove therein extending along the entire cut in which the blade points are engaged and in which a runup surface reaches as far as the top edge of the groove at least on the side of the groove on which the cord web runs up.

11. Device according to claim 1, in which retaining elements are provided which clamp the cord web fast on its support arranged in the area of the lateral edges of the cord web.

12. Device according to claim 1, in which retaining elements are provided which clamp the cord web fast on its support arranged in the area of the lateral edges of the cord web, the retaining elements being controllable by means of the displacement of the blade carriers.

13. Device according to claim 1, in which retaining elements are provided which clamp the cord web fast on its support arranged in the area of the lateral edges of the cord web, and in which a lifting spring is provided to act on the retaining elements and being in the form of one-armed levers having an upper runup curvature on which thrust units run up which are fastened on the blade carriers and are resiliently spring loaded and with rollers.

14. Device according to claim 1, in which the blades are liftable in their terminal positions.

15. Device according to claim 1, in which the blades are liftable in their terminal positions and in which the blades are fastened on vertically displaceable swivel bolts and thrust units are provided as rollers and which in the terminal positions run up on to a sliding rolling surface so that the swivel bolts are lifted together with the blades and arranged on the carrying elements for the blades.

16. Device according to claim 15, in which a double-acting pressure fluid cylinder is provided whose piston rod carries a thrust plate cooperating with the upper extremities of the swivel bolts and arranged on a stationary bridge.

17. Device according to claim 1, in which catches are provided for the cutting position and the raised position coordinated with swivel bolts.

18. Device according to claim 1, in which catches are provided consisting of grooves in the swivel bolts and catch elements springily engaging in the grooves.

19. Device according to claim 1, in which the blades have relatively obtuse-angled cutting edges.

20. Device according to claim 1, in which the blades are notched a short distance behind the points and widen upwards starting from the notch.

* * * * *